United States Patent
Brown et al.

(10) Patent No.: US 7,103,674 B2
(45) Date of Patent: Sep. 5, 2006

(54) APPARATUS AND METHOD OF REDUCING DATAFLOW DISTRUPTION WHEN DETECTING PATH MAXIMUM TRANSMISSION UNIT (PMTU)

(75) Inventors: Deanna Lynn Quigg Brown, Pflugerville, TX (US); Vinit Jain, Austin, TX (US); Jeffrey Paul Messing, Austin, TX (US); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 809 days.

(21) Appl. No.: 10/112,498

(22) Filed: Mar. 28, 2002

(65) Prior Publication Data

US 2003/0187975 A1    Oct. 2, 2003

(51) Int. Cl.
*G06F 15/16* (2006.01)
(52) U.S. Cl. .................... 709/234; 709/235; 709/238; 379/229; 379/235; 379/351
(58) Field of Classification Search ............... 709/237, 709/243, 234, 235, 238, 230; 370/474, 351, 370/229, 235
See application file for complete search history.

(56) References Cited

U.S. PATENT DOCUMENTS

| | | | | |
|---|---|---|---|---|
| 5,886,989 A | * | 3/1999 | Evans et al. | 370/347 |
| 5,892,753 A | * | 4/1999 | Badt et al. | 370/233 |
| 6,212,190 B1 | * | 4/2001 | Mulligan | 370/400 |
| 6,870,850 B1 | * | 3/2005 | Fichou et al. | 370/400 |
| 2002/0071436 A1 | * | 6/2002 | Border et al. | 370/395.32 |
| 2005/0025185 A1 | * | 2/2005 | Brown et al. | 370/474 |

OTHER PUBLICATIONS

"Path MTU Disovery" by J. Mogul and S. Deering. Network Working Group, RFC 1191, Nov. 1990.*

* cited by examiner

*Primary Examiner*—Saleh Najjar
*Assistant Examiner*—Vitali Korobov
(74) *Attorney, Agent, or Firm*—Volel Emile; Mark E. McBurney; Thomas E. Tyson

(57) ABSTRACT

A method, system and apparatus for reducing dataflow disruption when increases in path maximum transmission unit (PMTU) are being detected are provided. Conventionally, when increases in PMTU are being detected, an increased-in-size data packet is sent by a transmitting host. If an intermediate link is unable to process the data packet through, it drops the data packet and sends an error message to the transmitting host. The transmitting host has to reduce the size of the data packet and resend it. The procedure outlines in this disclosure obviates the need to resend the data packet. It does so by transmitting an old data packet that has been increased in size. Hence, there is no need to resend the data packet if it is dropped.

20 Claims, 7 Drawing Sheets

| BIT | 0 | 1 | 2 | 3 | 4 | 5 | 6 | 7 |
|---|---|---|---|---|---|---|---|---|
| BYTE 0 | 500 VERSION | | | | H LENGTH | | | |
| BYTE 1 | SERVICE TYPE | | | | | | | |
| BYTE 2 | TOTAL LENGTH | | | | | | | |
| BYTE 3 | | | | | | | | |
| BYTE 4 | IDENTIFICATION | | | | | | | |
| BYTE 5 | | | | | | | | |
| BYTE 6 | 510 FLAGS | | | | FRAGMENT OFFSET | | | |
| BYTE 7 | FRAGMENT OFFSET | | | | | | | |
| BYTE 8 | TIME-TO-LIVE | | | | | | | |
| BYTE 9 | PROTOCOL | | | | | | | |
| BYTE 10 | CHECKSUM | | | | | | | |
| BYTE 11 | | | | | | | | |
| BYTE 12 | SOURCE IP ADDRESS | | | | | | | |
| BYTE 13 | | | | | | | | |
| BYTE 14 | | | | | | | | |
| BYTE 15 | | | | | | | | |
| BYTE 16 | DESTINATION IP ADDRESS | | | | | | | |
| BYTE 17 | | | | | | | | |
| BYTE 18 | | | | | | | | |
| BYTE 19 | | | | | | | | |
| BYTE 20 | IP OPTIONS | | | | | | | |
| BYTE 21 | | | | | | | | |
| BYTE 22 | | | | | | | | |

FIG. 5

APPARATUS AND METHOD OF REDUCING DATAFLOW DISTRUPTION WHEN DETECTING PATH MAXIMUM TRANSMISSION UNIT (PMTU)

BACKGROUND OF THE INVENTION

1. Technical Field

The present invention is directed to communications networks. More specifically, the present invention is directed to a method and apparatus of minimizing dataflow disruption in network data streams when detecting PMTU.

2. Description of Related Art

It is generally accepted that for efficient data transfer using an IP (Internet protocol) connection, the data packet size should be as large as possible. The larger the packets, the lesser the overhead associated with transferring the entire data. However, if a packet is larger than any intermediate link (e.g., a router) can process, the packet will be fragmented at that link. The maximum size packet that a router can process without fragmenting the packet is called an MTU (maximum transmission unit). The maximum size packet that can be transferred from a transmitting host to a receiving host without fragmentation is called PMTU (path maximum transmission unit). Consequently, the PMTU is a function of the maximum size packets that all intermediate routers in an IP connection can process without fragmenting the packets.

It is well known that the path between two hosts on the Internet may vary over time. Indeed, there have been path variations based on types of data being transferred between two hosts. Consequently, the PMTU may vary over time. If the PMTU decreases during transmission of a particular piece of data, the packets may have to be fragmented.

When a packet is fragmented, it is split into multiple parts, each part containing enough information to allow for reassembly at the receiving host. Thus, once fragmented a packet will not be reassembled until it reaches its destination. Fragmentation is undesirable for numerous reasons. For example, if any one fragment from a packet is dropped, the entire packet has to be retransmitted. Further, it imposes extra processing load on the routers that have to split the packets. Last but not least, some firewalls may block all fragments because they don't contain the header information for a higher layer protocol (e.g., TCP) needed for filtration.

Thus, to ascertain that the largest size packets are being transmitted over an IP connection without being fragmented, the transmitting host periodically tries to detect PMTU variations. RFC (Request for Comments) 1191 describes a procedure to detect increases in the PMTU. Specifically, RFC 1191 suggests that a transmitting host should periodically send a larger size packet with an instruction that the packet not be fragmented. If the PMTU has not changed, the larger size packet will be dropped and the router that drops the packet will send an error message back to the host. If the PMTU has increased enough to allow the packet to reach its destination, then no error message will be received by the host. The host then may continue sending packets of that increased size.

RFC is a series of notes about the Internet, started in 1969 (when the Internet was still ARPANET). An Internet document can be submitted to the IETF (Internet Engineering Task Force) by anyone, but the IETF decides if the document becomes an RFC. If the document gains enough interest, it may eventually evolve into an Internet standard. Each RFC is designated by an RFC number. Once published, an RFC never changes. Modifications to an original RFC are assigned a new RFC number.

In any case, the procedure suggested by RFC 1191 to detect PMTU increases may potentially slow down the data transfer. Particularly, the PMTU is not likely to change very often. Thus, each time the transmitting host tries to detect increases in the PMTU, the data packet used toward that end will most likely be dropped. When the data packet is dropped, the application program that is transferring the data has to detect such and retransmit the packet. Depending on the length of the data being transferred, the transfer rate may be affected quite considerably.

Thus, what is needed is a method and apparatus for detecting PMTU increases that will not affect transfer rate of data.

SUMMARY OF THE INVENTION

The present invention provides a method, system and apparatus for reducing dataflow disruption when increases in path maximum transmission unit (PMTU) are being detected. Conventionally, when increases in PMTU are being detected, an increased-in-size data packet is sent by a transmitting host. If an intermediate link is unable to process the data packet through, it drops the data packet and sends an error message to the transmitting host. The transmitting host has to reduce the size of the data packet and resend it. The procedure outlines in this disclosure obviates the need to resend the data packet. It does so by transmitting an old data packet that has been increased in size. Hence, there is no need to resend the data packet if it is dropped.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 depicts an IP header in bytes format.

DETAILED DESCRIPTION OF THE PREFERRED EMBODIMENT

Figure 1:
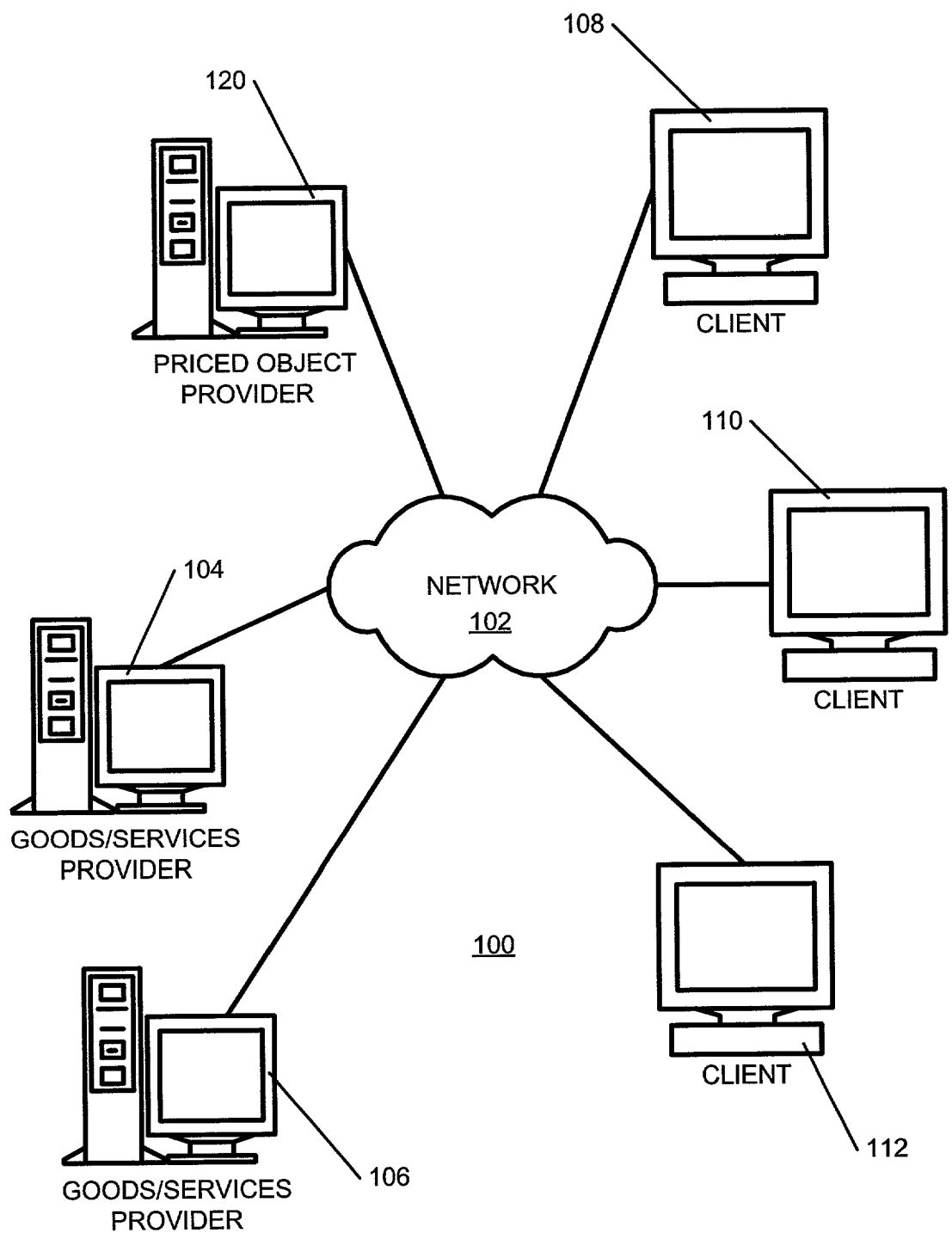
FIG. 1 is an exemplary block diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
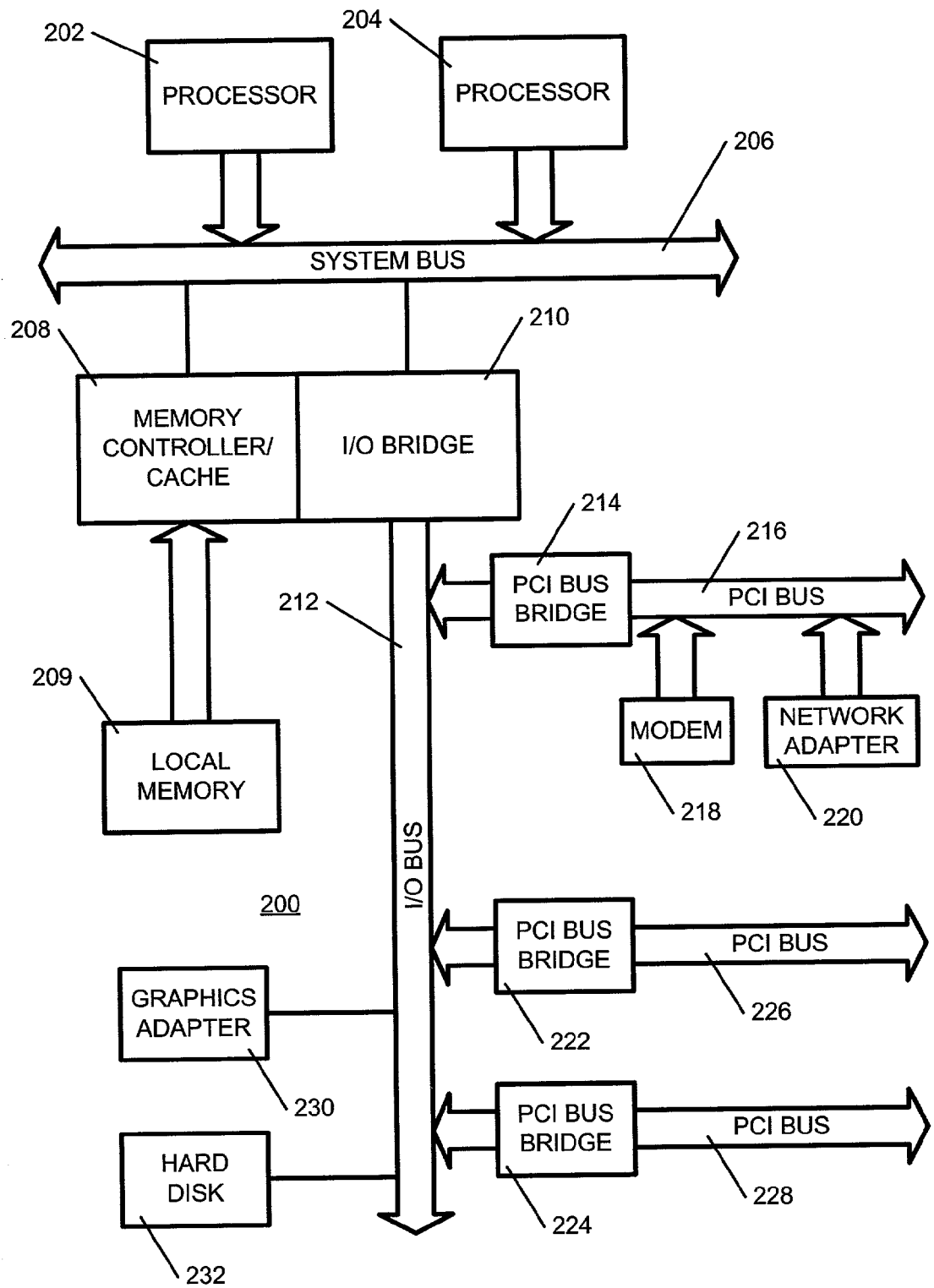
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
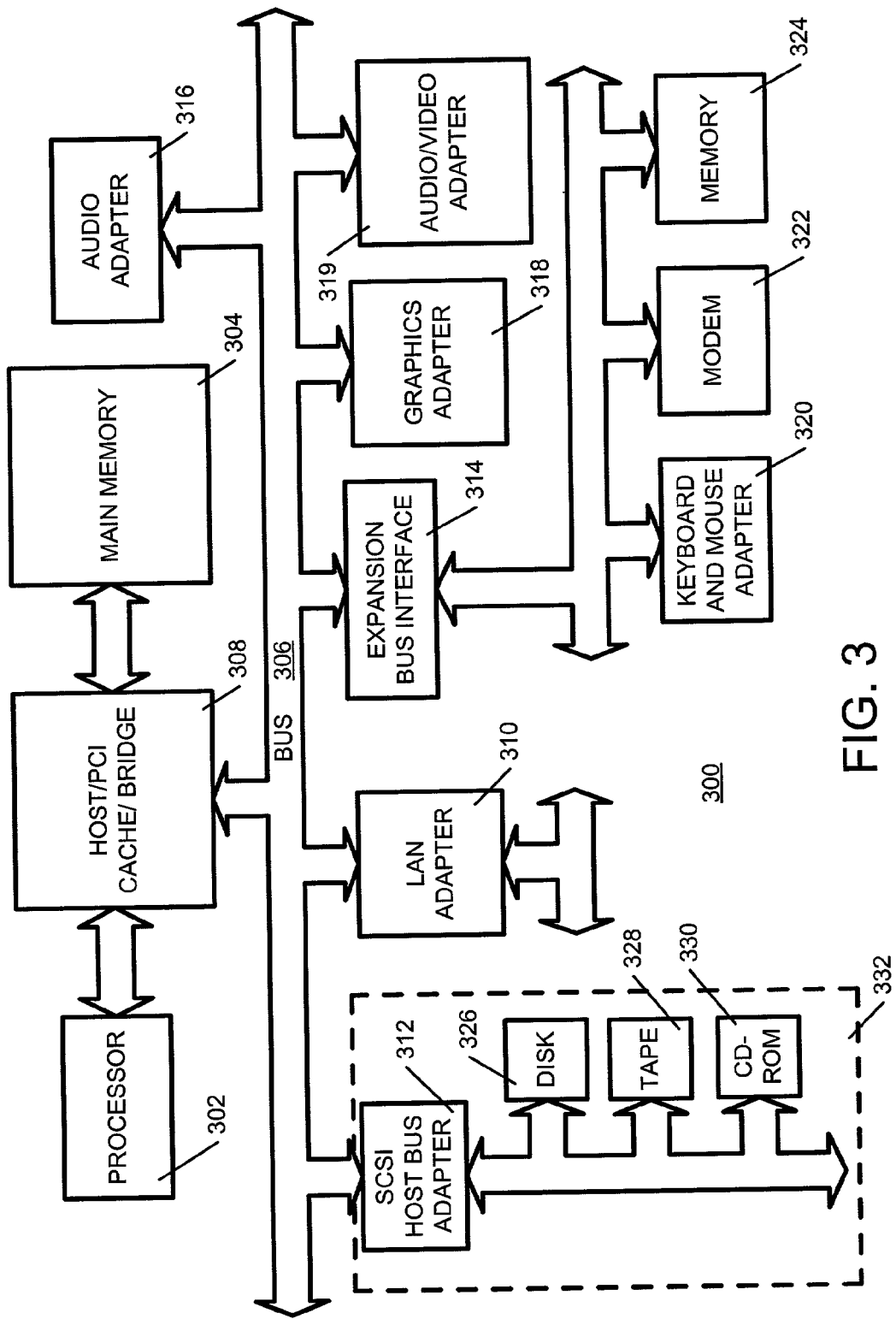
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer in addition to taking the form of a PDA. Data processing system 300 also may be a kiosk or a Web appliance.

The present invention provides an apparatus and method of detecting PMTU that minimizes adverse affects on data transfer rates. The invention may be local to client systems 108, 110 and 112 of FIG. 1 or to the server 104 or to both the server 104 and clients 108, 110 and 112. Consequently, the present invention may reside on any data storage medium (i.e., floppy disk, compact disk, hard disk, ROM, RAM, etc.) used by a computer system.

Figure 4:
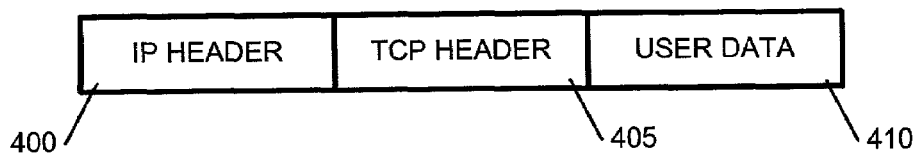
FIG. 4 depicts a data packet with a TCP/IP header.

For a proper perspective, a representative data packet with a TCP/IP header will be described. FIG. 4 depicts such a data packet. When data is to be transmitted to a target computer system from a source system, the source system will first divide the data into packets, if the data is of a length longer than the allowable data packet length. Each packet then is sent to a TCP stack where a TCP header 405 is added to data 410. From the TCP stack, the data packet including the TCP header 405 is forwarded to an IP stack. There, IP header 400 is added to the data packet. Once the IP header is added, the data packet is allowed to enter the network through a network interface (e.g., an Ethernet adapter or card).

FIG. 5 depicts an IP header in bytes format. Version 500 is the version of the IP protocol used to create the data packet and header length 502 is the length of the header. Service type 504 specifies how an upper layer protocol would like a current data packet handled. Each data packet is assigned a level of importance. Total length 506 specifies the length, in bytes, of the entire IP data packet, including the data and header. Identification 508 is used when a packet is fragmented into smaller pieces while traversing a network. This identifier is assigned by the transmitting host so that different fragments arriving at the destination can be associated with each other for re-assembly. For example, if while traversing the network a router fragments the packet, the router will use the IP identification number in the header with all the fragments. Thus, when the fragments arrive at their destination they can be easily identified.

Flags 510 is used for fragmentation and re-assembly. The first bit is called "More Fragments" (MF) bit, and is used to indicate the last fragment of a packet so that the receiver knows that the packet can be re-assembled. The second bit is the "Do not Fragment" (DF) bit, which suppresses fragmentation. The third bit is unused and is always set to zero (0). Fragment Offset 512 indicates the position of the fragment in the original packet. In the first packet of a fragment stream, the offset will be zero (0). In subsequent fragments, this field indicates the offset in increments of 8 bytes. Thus, it allows the destination IP process to properly reconstruct the original data packet. Time-to-Live 514 maintains a counter that gradually decrements each time a router handles the data packet. When it is decremented down to zero (0), the data packet is discarded. This keeps data packets from looping endlessly on the network. Protocol 516 indicates which upper-layer protocol (e.g., TCP, UDP etc.) is to receive the data packets after IP processing has completed. Checksum 518 helps ensure the IP header integrity. Source IP Address 720 specifies the sending node and destination IP Address 722 specifies the receiving node. Options 524 allows IP to support various options, such as security.

Figure 6:
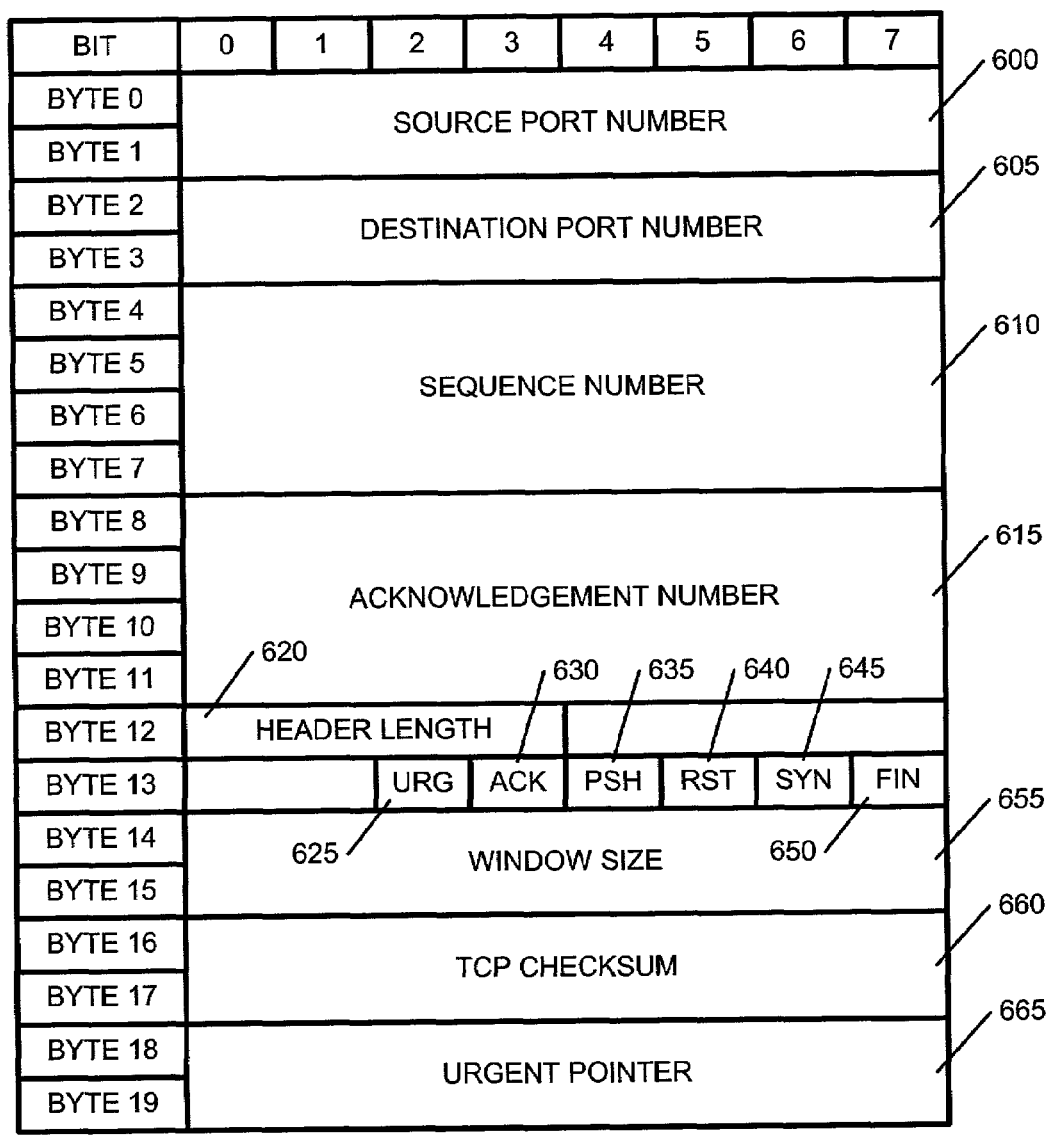
FIG. 6 depicts a TCP header in bytes format.

FIG. 6 depicts a TCP header format. The first two bytes of the TCP header is 16-bit source port number 600. The next two bytes of the TCP header is the 16-bit destination port number 605. The port numbers are used to keep track of different conversations. For example, if a server is communicating with three different clients, the server will use a particular port number to communicate with each one of the clients. Thus, the 16-bit source port number 600 and the 16-bit destination port number 605 in conjunction with the IP address in the IP header identify a unique connection. This unique connection is often referred to as a socket.

Each data packet has a 32-bit sequence number 610. The sequence number is used to let the receiving computer system know the order of a particular packet in the stream of packets. It is also used by the receiving computer system to notify the sending computer system that all packets have been received up to a certain number. TCP does not number the data packets but rather numbers the octets (8-bit data) in each data packet. Thus, if there are 500 octets in each packet, the first data packet may have a sequence number of "0", the second "500", the third "1000" etc.

In order to ensure that a data packet has been received, the recipient has to send back a 32-bit acknowledgement response to the sender. For example, if a recipient sends an acknowledgement of 1500, it is telling the sender that it has received all the data up to octet number 1500. If the sender does not get an acknowledgement response within a pre-determined time, it will resend the data. When a data sender receives a new value, it can dispose of data that was held for possible re-transmission. The acknowledgement number is only valid when ACK flag 630 is set.

The 16-bit window size 655 represents the number of bytes starting with the byte specified in the acknowledgement number field 610 that the receiver is willing to accept. Stating differently, the window is used to control how much data can be in transit at any one time. It, in a way, advertises the amount of buffer space that has been allocated for the connection. The window size is used because it is not practical to wait for each datagram to be acknowledged before sending the next one, lest data transactions over the Internet may be too slow. On the other hand, a sender cannot just keep sending data, or a fast computer system might overrun the capacity of a slow one. Thus, each computer system indicates how much new data it is currently prepared to absorb by putting the number of octets in its 16-bit window. As a recipient receives data, its window size will decrease until it reaches zero (0). At that point, the sender has to stop. As the receiver processes the data, it will increase its window size signaling that it is able to accept more data. Often times, the same data packet may be used both to acknowledge receipt of a set of data and to give transmission permission for additional new data.

The 4-bit header length 620 indicates the size of the entire TCP header. In FIG. 6, options, padding, reserve and a few other fields are not shown. The options field depends on the number of options set and thus is of variable length. Accordingly, there is not a pre-determined length for the TCP header. Hence, the length of each header has to be indicated.

When one-bit URG 625 is used, it indicates that the 32-bir urgent pointer field 665 is valid. As mentioned before, when one-bit ACK 630 is set, the 32-bit acknowledgement number 615 is valid. One-bit PSH 635 is used to instruct the receiver to pass the data received thus far immediately to the receiving application. RST 640 is used to tell the receiver to re-establish connection. This usually indicates that an error condition has been detected. SYN bit 645 synchronizes the sequence numbers to begin a connection and FIN bit 650 indicates that the sender has sent all data in a stream. If both ends of a communication have sent the FIN flag, the connection will be closed.

The 16-bit checksum 660 ensures that the TCP header and data have not been modified in transit. If the checksum is invalid, the receiver will not acknowledge the message. The value in 16-bit urgent pointer 665 points to the end of data field that is considered urgent and requires immediate attention. This field is not valid if URG bit 625 is not set.

As mentioned earlier, periodically a transmitting host performs a PMTU discovery. The discovery entails transmitting a packet that has a maximum size of the lesser of the local MTU or the MSS (maximum segment size) announced by the remote system. The discovery packets are sent with the DF bit set (see Flags 510 in FIG. 5). If there is some MTU between the two hosts, which is too small to pass the packet successfully, then a "can't fragment" error will be sent back to the source. The transmitting host will then know to decrease the size of the packets.

Figure 7:
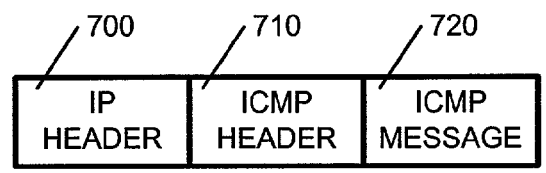
FIG. 7 depicts an ICMP data packet.

The "can't fragment" error is sent using Internet control message protocol (ICMP). ICMP is an extension to IP and is used to support packet containing errors, control and informational messages. FIG. 7 depicts an ICMP data packet. As is shown, ICMP header 710 is located right after IP header 700. The ICMP packet may contain an ICMP message.

Figure 8:
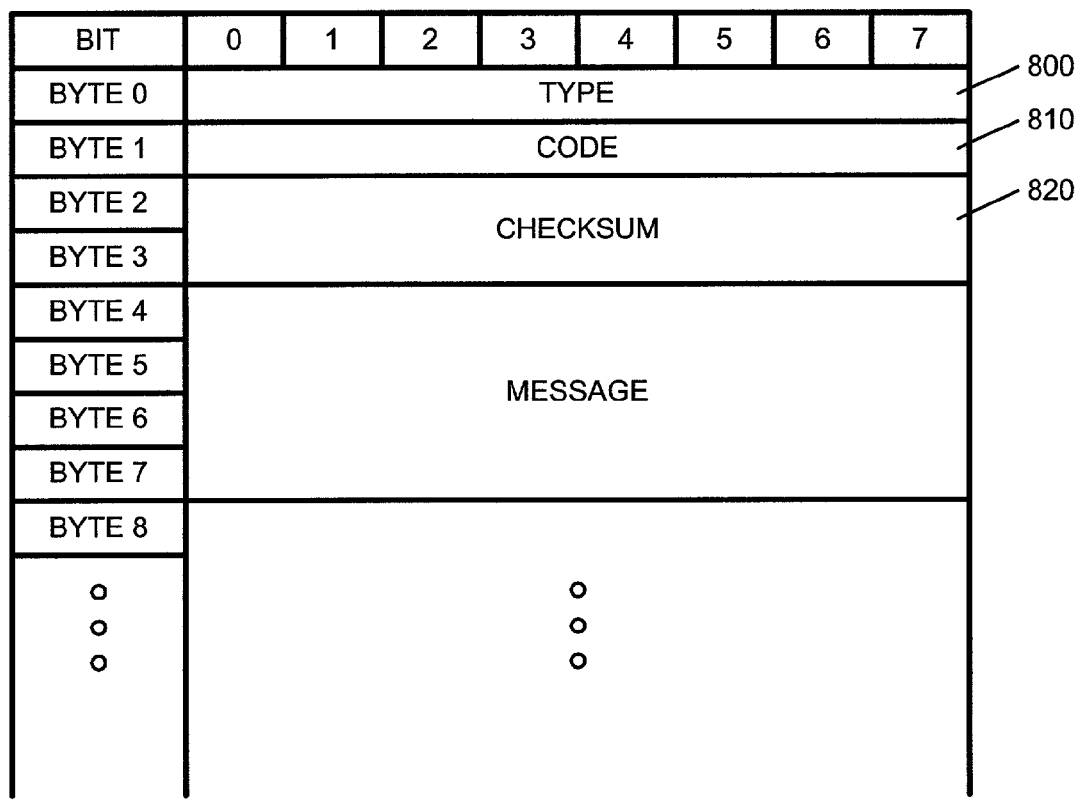
FIG. 8 depicts an ICMP header in bytes format.

FIG. 8 depicts an ICMP header format. Byte 0 is reserved for type 800. Type 800 can have a value from zero (0) to 256. When type 800 has a value of three (3), it indicates that the destination of the packet is unreachable. This is the value of type 800 when the "can't fragment" error is sent to the transmitting host.

Code 810 modified type 800. In this present case, a code 4 will be sent in the ICMP message. Code 4 indicates that fragmentation is needed but the "Do not Fragment" bit is set. Checksum 820 is used to ensure that there have not been errors introduced in the ICMP packet during transit.

When a type 3 code 4 ICMP packet is received by the transmitting host, the host has to retransmit the packet, it indicates that the packet was dropped by the router that sent the ICMP packet. Thus, the host has to retransmit the packet. The present invention obviates the need for the transmitting host to retransmit a dropped packet when performing PMTU discovery.

The present invention uses an old data packet (i.e. a previously sent packet) with the "don't fragment" bit set when doing PMTU discovery. To increase the packet size, the invention may pad the packet. When a router cannot process through the larger size packet, it will drop the packet and send an ICMP packet back to the transmitting host. However, when the host receives the ICMP packet, it need not retransmit the dropped packet since it was a previously sent packet. If the receiving host receives the old packet, it silently discards it. If the transmitting host does not get an error message during the roundtrip time (a known time) of a packet, it assumes that the PMTU has increased and starts sending larger size packets. This method allows for the detection of PMTU increases with minimal disruption to the dataflow in situations where the PMTU increases infrequently.

Figure 9:
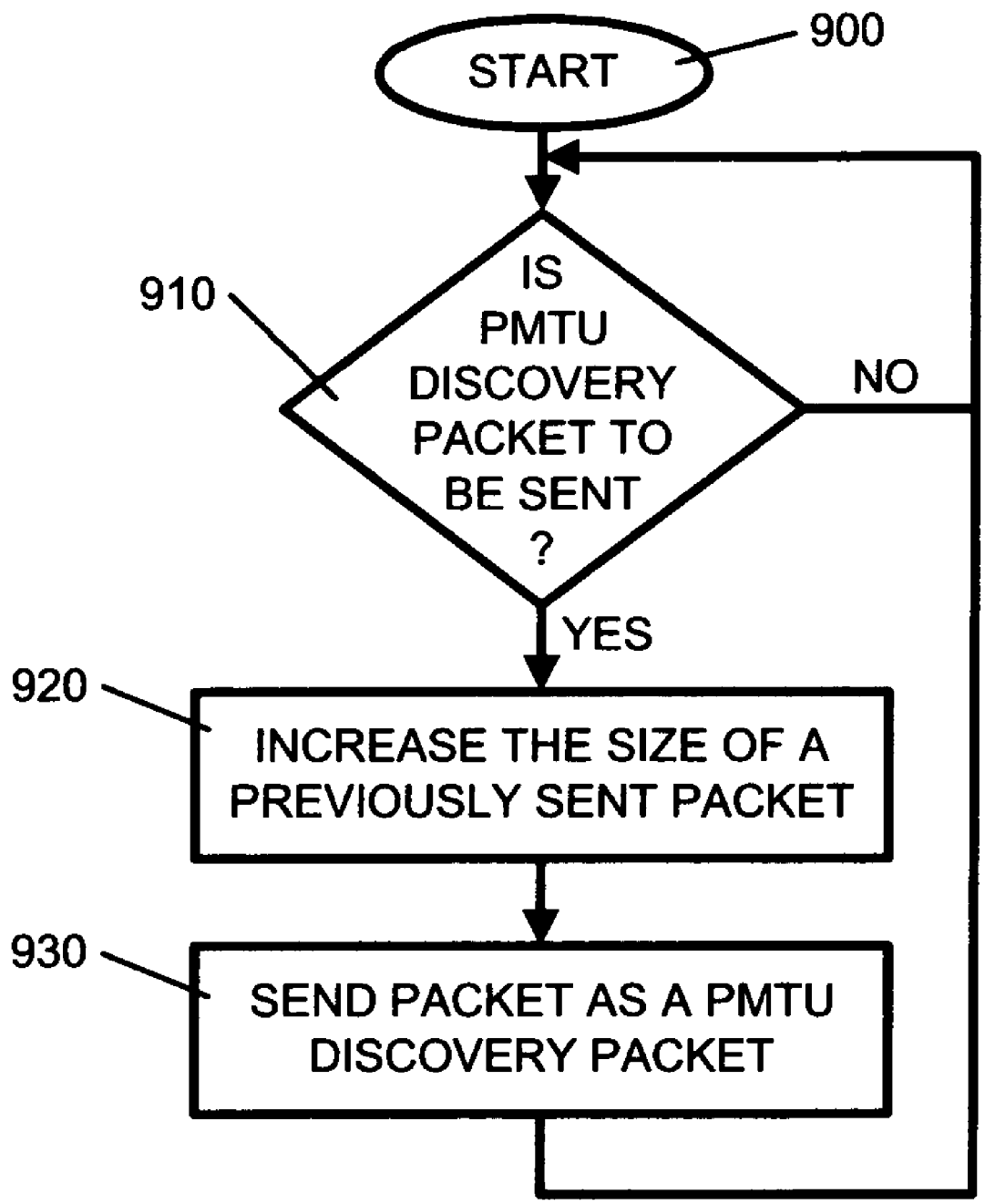
FIG. 9 is a flow chart of a process that may be used with the invention.

FIG. 9 is a flow chart of a process that may be used with the invention. The process starts each time data is to be transmitted over a network (step 900). A check is continuously being made to determine whether a PMTU discovery packet is to be sent. If so, a previously sent packet is increased in size and sent as the PMTU discovery packet and the process returns to step 910 (steps 910, 920 and 930). The process ends when the data transfer terminates.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of reducing disruption of a data transmission when increases in path maximum transmission unit (PMTU) are being detected comprising the steps of:
   transmitting the data one packet at a time;
   determining whether a PMTU discovery packet is to be transmitted;
   increasing a previously successfully transmitted of the packet in size; and
   transmitting the increased in size packet as a PMTU discovery packet.

2. The method of claim 1 wherein the packet is increased in size by padding the packet.

3. The method of claim 2 wherein if an intermediate link is unable to process the packet through due to its size an error message is generated indicating such.

4. The method of claim 3 wherein when an error message is generated the packet is dropped but is not retransmitted.

5. The method of claim 1 wherein if the packet reaches its destination it is silently dropped thereat and the PMTU is increased to the size of the packet.

6. A computer program product on a computer readable medium for reducing disruption of the data transmission when increases in path maximum transmission unit (PMTU) are being detected comprising:
   code means for transmitting the data one packet at a time;
   code means for determining whether a PMTU discovery packet is to be transmitted;
   code means for increasing a previously successfully transmitted of the packet in size; and
   code means for transmitting the increased in size packet as a PMTU discovery packet.

7. The computer program product of claim 6 wherein the packet is increased in size by padding the packet.

8. The computer program product of claim 7 wherein if an intermediate link is unable to process the packet through due to its size an error message is generated indicating such.

9. The computer program product of claim 8 wherein when an error message is generated the packet is dropped but is not retransmitted.

10. The computer program product of claim 6 wherein if the packet reaches its destination it is silently dropped thereat and the PMTU is increased to size of the packet.

11. An apparatus for reducing disruption of a data transmission when increases in path maximum transmission unit (PMTU) are being detected comprising:
    means for determining whether a PMTU discovery packet is to be transmitted; means for transmitting the data one packet at a time;
    means for increasing a previously successfully transmitted of the packet in size; and
    means for transmitting the increased in size packet as a PMTU discovery packet.

12. The apparatus of claim 11 wherein the packet is increased in size by padding the packet.

13. The apparatus of claim 12 wherein if an intermediate link is unable to process the packet through due to its size an error message is generated indicating such.

14. The apparatus of claim 13 wherein when an error message is generated the packet is dropped but is not retransmitted.

15. The apparatus of claim 11 wherein if the packet reaches its destination it is silently dropped thereat and the PMTU is increased to the size of the packet.

16. A computer system for reducing disruption of a data transmission when increases in path maximum transmission unit (PMTU) are being detected comprising:
   at least one storage device to store code data; and
   at least one processor for processing the code data transmitting the data one packet at a time; to determine whether a PMTU discovery packet is to be transmitted, to increase a previously successfully transmitted of the packet in size and to transmit the increased in size packet as a PMTU discovery packet.

17. The computer system of claim 16 wherein the packet is increased in size by padding the packet.

18. The computer system of claim 17 wherein if an intermediate link is unable to process the packet through due to its size an error message is generated indicating such.

19. The computer system of claim 18 wherein when an error message is generated the packet is dropped but is not retransmitted.

20. The computer system of claim 16 wherein if the packet reaches its destination it is silently dropped thereat and the PMTU is increased to the size of the packet.

* * * * *